US006625655B2

United States Patent
(12)

Goldhor et al.

(10) Patent No.: US 6,625,655 B2
(45) Date of Patent: *Sep. 23, 2003

(54) METHOD AND APPARATUS FOR PROVIDING CONTINUOUS PLAYBACK OR DISTRIBUTION OF AUDIO AND AUDIO-VISUAL STREAMED MULTIMEDIA REVEIVED OVER NETWORKS HAVING NON-DETERMINISTIC DELAYS

(75) Inventors: Richard S. Goldhor, Belmont, MA (US); Donald J. Hejna, Jr., Los Altos, CA (US)

(73) Assignee: Enounce, Incorporated, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/304,761

(22) Filed: May 4, 1999

(65) Prior Publication Data

US 2002/0040403 A1 Apr. 4, 2002

(51) Int. Cl.$^{7}$ .................................................. G06F 15/16

(52) U.S. Cl. ........................ 709/231; 709/232; 709/233

(58) Field of Search ................................ 709/217, 219, 709/231, 232, 233, 234, 235; 348/6, 7, 513, 516, 518; 725/101, 92, 93, 94, 95, 96

(56) References Cited

U.S. PATENT DOCUMENTS 5,175,769 A * 12/1992 Hejna et al. ................ 704/211
5,544,324 A * 8/1996 Edem et al. ................ 709/231
5,630,013 A * 5/1997 Suzuki et al. ............... 704/216
5,649,050 A * 7/1997 Hardwick et al. .......... 704/203
5,652,627 A * 7/1997 Allen ......................... 348/497
5,692,213 A * 11/1997 Goldberg et al. ........... 345/302
5,720,037 A * 2/1998 Biliris et al. .................. 725/92
5,745,758 A * 4/1998 Shaw et al. ................. 709/102
5,758,076 A * 5/1998 Wu et al. ................... 709/231
5,767,863 A * 6/1998 Kimura ....................... 345/531
5,793,980 A * 8/1998 Glaser et al. ............... 709/231
5,808,662 A * 9/1998 Kinney et al. ................ 348/15
5,818,436 A * 10/1998 Imai et al. .................. 345/302
5,822,537 A * 10/1998 Katseff et al. ............. 709/231
5,842,172 A * 11/1998 Wilson ....................... 704/503
5,864,678 A * 1/1999 Riddle ........................ 709/235
5,864,682 A * 1/1999 Porter et al. ................ 709/247
5,893,062 A * 4/1999 Bhadkamkar et al. ...... 704/270
5,953,506 A * 9/1999 Kalra et al. ................. 709/231
5,973,255 A * 10/1999 Tanji ........................... 84/636
6,018,359 A * 1/2000 Kermode et al. ........... 725/101
6,086,537 A * 7/2000 Urbano et al. .............. 600/443
6,123,548 A * 9/2000 Tallal et al. ................ 434/185
6,169,843 B1 * 1/2001 Lenihan et al. ............... 386/46

* cited by examiner

*Primary Examiner*—Mark R. Powell
*Assistant Examiner*—William C. Vaughn, Jr
(74) *Attorney, Agent, or Firm*—Michael B. Einschlag

(57) ABSTRACT

An embodiment of the present invention is an apparatus for preparing streaming media such as an audio or audio-visual work for playback which comprises: (a) a buffer which stores data corresponding to the streaming media; (b) a buffer monitor which determines an amount of data stored in the buffer; (c) a rate determiner, in response to output from the buffer monitor, that determines a playback rate; and (d) a time-scale modification system, responsive to the playback rate, that time-scale modifies at least a portion of the data in the buffer. In a further embodiments, a playback system plays back the time-scale modified data as a portion of the streaming media.

2 Claims, 4 Drawing Sheets

| | |
|---|---|
| $0 \leq x \leq T_L$ | PLAYBACK RATE = $(SCALE)\tanh^{-1}((X-T_L)/(T_L))$ |
| $T_L < x_L < T_H$ | PLAYBACK RATE = 1.0 |
| $T_H \leq x \leq MAX$ | PLAYBACK RATE = $(SCALE)\tanh^{-1}((X-T_H)/(MAX-T_H))$ |

METHOD AND APPARATUS FOR PROVIDING CONTINUOUS PLAYBACK OR DISTRIBUTION OF AUDIO AND AUDIO-VISUAL STREAMED MULTIMEDIA REVEIVED OVER NETWORKS HAVING NON-DETERMINISTIC DELAYS

TECHNICAL FIELD OF THE INVENTION

The present invention pertains to the field of playback of streaming media such as audio and audio-visual works which are retrieved from sources having non-deterministic delays such as, for example, a server such as a file server or a streaming media server, broadcasting data via the Internet. In particular, the present invention pertains to method and apparatus for providing playback of an audio or audio-visual work received from sources having non-deterministic delays. In further particular, the present invention pertains to method and apparatus for providing continuous playback of streaming media from sources having non-deterministic delays such as, for example, a server such as a file server or a streaming media server, broadcasting data via the Internet, an Intranet, or the like.

BACKGROUND OF THE INVENTION

Many digitally encoded audio and audio-visual works are stored as data on servers such as file servers or streaming media servers that are accessible via the Internet for users to download. FIG. 1 shows, in schematic form, how such audio or audio-visual works are distributed over the Internet. As shown in FIG. 1, media broadcast server 2000 accesses data representing the audio or audio-visual work from storage medium 2100 and broadcasts the data to multiple recipients $\mathbf{2300}_1$ to $\mathbf{2300}_n$ across non-deterministic delay network 2200. In this system there are two main sources of random delay: (a) delay due to the broadcast server's accessing storage medium 2100 and (b) delay due to the congestion, interference, and other delay mechanisms within network 2200.

One well known technique for providing playback of the audio or audio-visual work is referred to as batch playback. Batch playback entails downloading an entire work and initiating playback after the entire work has been received. Another well known technique for providing playback of the audio or audio-visual work is referred to as "streaming." Streaming entails downloading data which represents the audio or audio-visual work and initiating playback before the entire work has been received.

There are several disadvantages inherent in both of these techniques. A prime disadvantage of batch playback is that the viewer/listener must wait for the entire work to be downloaded before any portion of the work may be played. This can be tedious since the viewer/listener may wait a long time for the transmission to occur, only to discover that the work is of little or no interest soon after playback is initiated. The streaming technique alleviates this disadvantage of batch playback by initiating playback before the entire work has been received. However, a disadvantage of streaming is that playback is often interrupted when the flow of data is interrupted due to network traffic, congestion, transmission errors, and the like. These interruptions are tedious and annoying since they occur randomly and have a random duration. In addition, intermittent interruptions often cause the context of the playback stream to be lost as a user waits for playback to be resumed when new data is received.

As one can readily appreciate from the above, a need exists in the art for a method and apparatus for providing substantially continuous playback of streaming media such as audio and audio-visual works received from sources having non-deterministic delays such as a server, for example, a file server or a streaming media server, broadcasting data via the Internet.

SUMMARY OF THE INVENTION

Embodiments of the present invention advantageously satisfy the above-identified need in the art and provide method and apparatus for providing substantially continuous playback of streaming media such as audio and audio-visual works received from sources having non-deterministic delays such as a server, for example, a file server or a streaming media server, broadcasting data via the Internet.

One embodiment of the present invention is an apparatus for preparing streaming media such as an audio or audio-visual work for playback which comprises: (a) a buffer which stores data corresponding to the streaming media; (b) a buffer monitor which determines an amount of data stored in the buffer; (c) a rate determiner, in response to output from the buffer monitor, that determines a playback rate; and (d) a time-scale modification system, responsive to the playback rate, that time-scale modifies at least a portion of the data in the buffer. In further embodiments, a playback system plays back the time-scale modified data as a portion of the streaming media.

DETAILED DESCRIPTION

Figure 1:
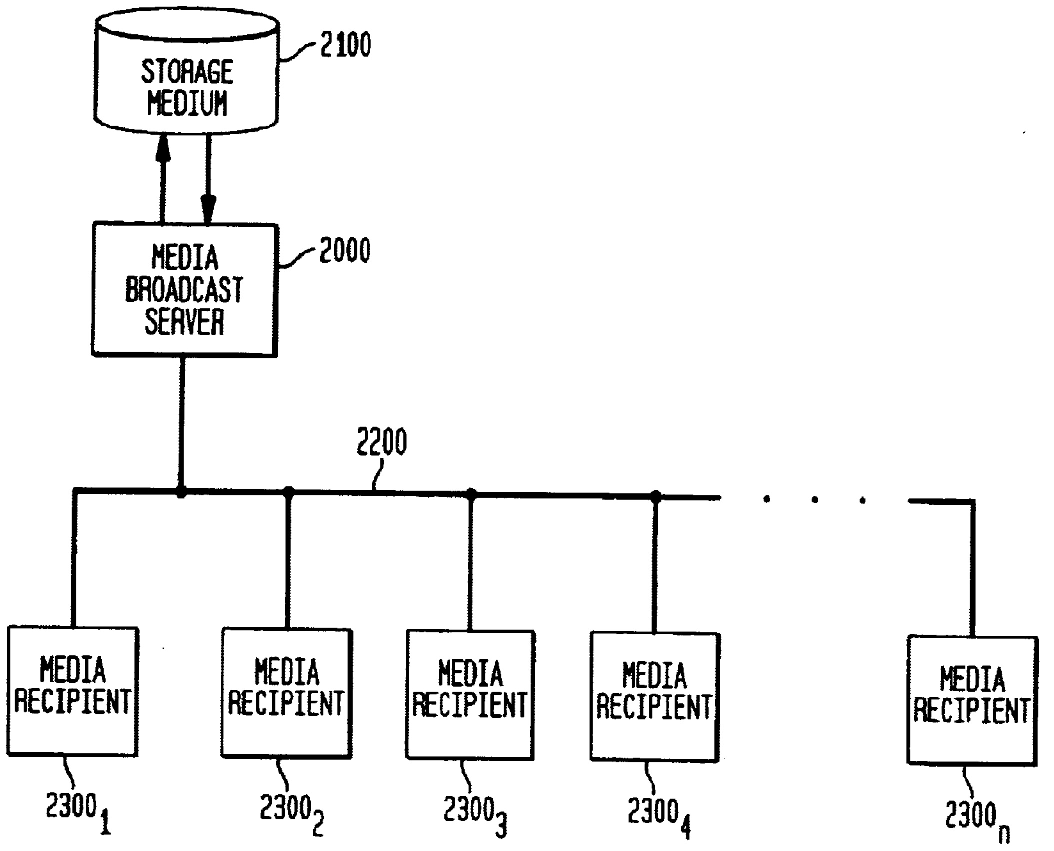
FIG. 1 shows, in schematic form, how audio or audio-visual works are broadcast from a server, for example, a file server or a streaming media server, to recipients over a network such as, for example, the Internet.
Figure 2:
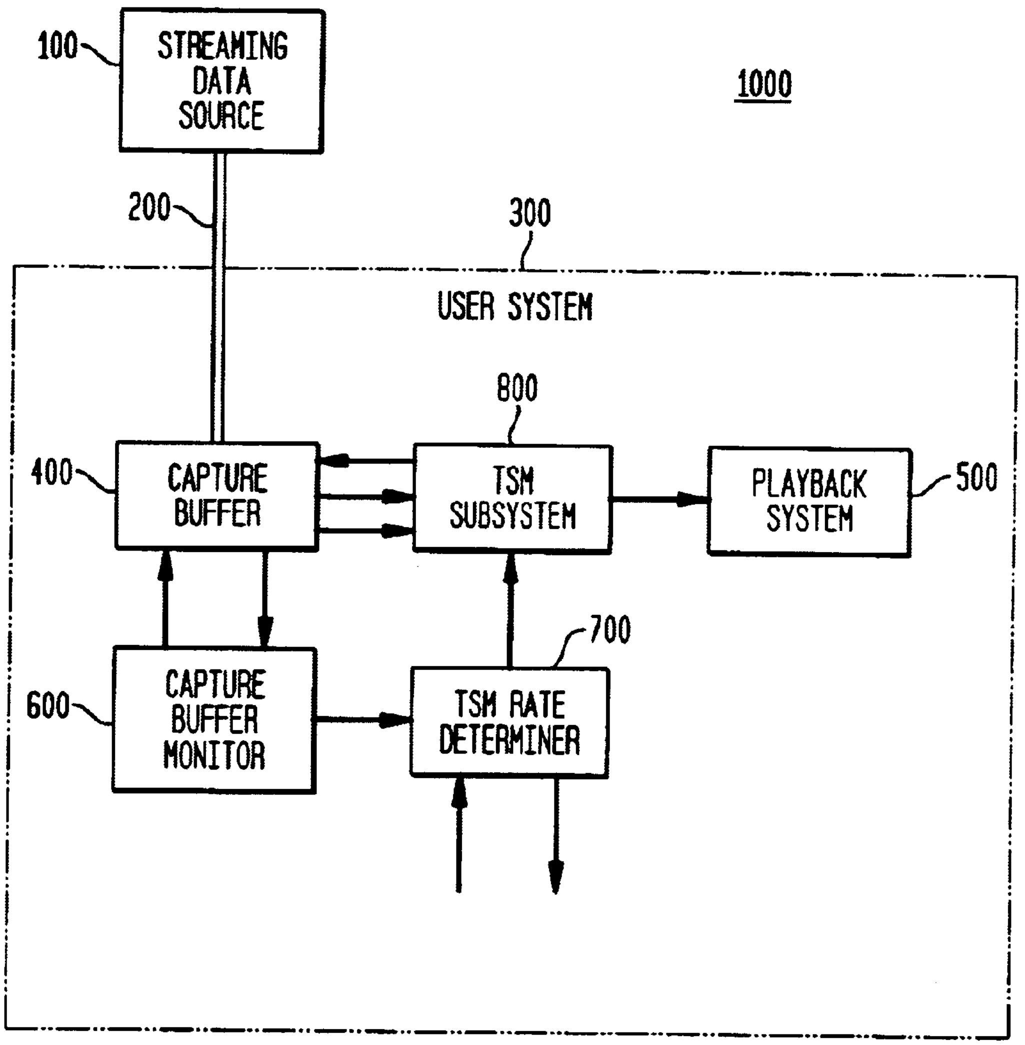
FIG. 2 shows a block diagram of an embodiment of the present invention which provides substantially continuous playback of an audio or audio-visual work received from a source having non-deterministic delays such as a server, for example, a file server or a streaming media server, broadcasting data via the Internet.

FIG. 2 shows a block diagram of embodiment 1000 of the present invention which provides substantially continuous playback of an audio or audio-visual work received from a source having non-deterministic delays such as a server, for example, a file server or a streaming media server, broadcasting via the Internet. As shown in FIG. 2, streaming data source 100 provides data representing an audio or audio-visual work through network 200 to User System 300 (US 300), which data is received at a non-deterministic rate by US 300. Capture Buffer 400 in US 300 receives the data as input. In a preferred embodiment of the present invention, Capture Buffer 400 is a FIFO (First In First Out) buffer existing, for example, in a general purpose memory store of US 300.

In the absence of delays in data arrival at US 300 from network 200, the amount of data in Capture Buffer 400 ought to remain substantially constant as the data transfer rate is typically chosen to be substantially equal to the playback rate. However, as is well known to those of ordinary skill in the art, pauses and delays in transmission of the data through network 200 to Capture Buffer 400 cause data depletion since data is simultaneously being output (for example, at a constant rate) from Capture Buffer 400 to satisfy data requirements of Playback System 500. As is well known, if the data transmitted to US 300 is delayed long enough, data in Capture Buffer 400 will be consumed and Playback System 500 must pause until a sufficient amount of data has arrived to enable resumption of playback. Thus, a typical playback system must constantly check for arrival of new data while the playback system is paused and it must initiate playback once new data is received.

In accordance with the present invention, data input to Capture Buffer 400 of US 300 is buffered for a predetermined amount of time which typically varies, for example, from one (1) second to several seconds. Then, Time-Scale Modification (TSM) methods are used to slow the playback rate of the audio or audio-visual work to substantially match a data drain rate required by Playback System 500 with a streaming data rate of the arriving data representing the audio or audio-visual work. As is well known to those of ordinary skill in the art, presently known methods for Time-Scale Modification ("TSM") enable digitally recorded audio to be modified so that a perceived articulation rate of spoken passages, i.e., a speaking rate, can be modified dynamically during playback. During Time-Scale expansion, TSM Subsystem 800 requires less input data to generate a fixed interval of output data. Thus, in accordance with the present invention, if a delay occurs during transmission of the audio or audio-visual work from network 200 to US 300 (of course, it should be clear that such delays may result from any number of causes such as delays in accessing data from a storage device, delays in transmission of the data from a media server, delays in transmission through network 200, and so forth), the playback rate is automatically slowed to reduce the amount of data drained from Capture Buffer 400 per unit time. As a result, and in accordance with the present invention, more time is provided for data to arrive at US 300 before the data in Capture Buffer 400 is exhausted. Advantageously, this delays the onset of data depletion in Capture Buffer 400 which would cause Playback System 500 to pause.

As shown in FIG. 2, Capture Buffer 400 receives the following as input: (a) media data input from network 200; (b) requests for information about the amount of data stored therein from Capture Buffer Monitor 600; and (c) media stream data requests from TSM Subsystem 800. In response, Capture Buffer 400 produces the following as output: (a) a stream of data representing portions of an audio or audio-visual work (output to TSM Subsystem 800); (b) a stream of location information used to identify the position in the stream of data (output to TSM Subsystem 800); and (c) the amount of data stored therein (output to Capture Buffer Monitor 600). It should be well known to those of ordinary skill in the art that Capture Buffer 400 may include a digital storage device. There are many methods well known to those of ordinary skill in the art for utilizing digital storage devices, for example a "hard disk drive," to store and retrieve general purpose data. There exist many commercially available apparatus which are well known to those of ordinary skill in the art for use as a digital storage device such as, for example, a CD-ROM, a digital tape, a magnetic disc.

As further shown in FIG. 2, and in accordance with the present invention, TSM Rate Determiner 700 receives the following as input: (a) a signal (from Capture Buffer Monitor 600) that represents the amount of data present in Capture Buffer 400; (b) a signal (output, for example, from Playback System 500 or from another module of US 300) that represents a current data consumption rate of Playback System 500; (c) a low threshold value parameter ($T_L$ which is described in detail below) for the amount of data in Capture Buffer 400; (d) a high threshold value parameter ($T_H$ which is described in detail below) for the amount of data in Capture Buffer 400; (e) a parameter designated Interval_Size; and (f) a parameter designated Speed_Change_Resolution. In response, TSM Rate Determiner 700 produces as output a rate signal representing a TSM rate, or playback rate, which can help better balance the data consumption rate of Playback System 500 with an arrival rate of data at Capture Buffer 400.

In a preferred embodiment of the present invention, TSM Rate Determiner 700 uses a parameter Interval_Size to segment the input digital data stream in Capture Buffer 400 and to determine a single TSM rate for each segment of the input digital stream. Note, the length of each segment is given by the value of the Interval_Size parameter.

TSM Rate Determiner 700 uses a parameter Speed_Change_Resolution to determine appropriate TSM rates to pass to TSM Subsystem 800. A desired TSM rate is converted to one of the quantized levels in a manner which is well known to those of ordinary skill in the art. This means that the TSM rate, or playback rate, can change only if the desired TSM rate changes by an amount that exceeds the difference between quantized levels, i.e., Speed_Change_Resolution. As a practical matter then, parameter Speed_Change_Resolution filters small changes in TSM rate, or playback rate. The parameters Interval_Size and Speed_Change_Resolution can be set as predetermined parameters for embodiment 1000 in accordance with methods which are well known to those of ordinary skill in the art or they can be entered and/or varied by receiving user input through a user interface in accordance with methods which are well known to those of ordinary skill in the art. However, the manner in which these parameters are set and/or varied are not shown for ease of understanding the present invention.

As still further shown in FIG. 2, TSM Subsystem 800 receives as input: (a) a stream of data representing portions of the audio or audio-visual work (output from Capture Buffer 400); (b) a stream of location information (output from Capture Buffer 400) used to identify the position in the stream of data being sent, for example, a sample count or time value; and (c) the rate signal specifying the desired TSM rate, or playback rate (output from TSM Rate Determiner 700).

Figure 5:
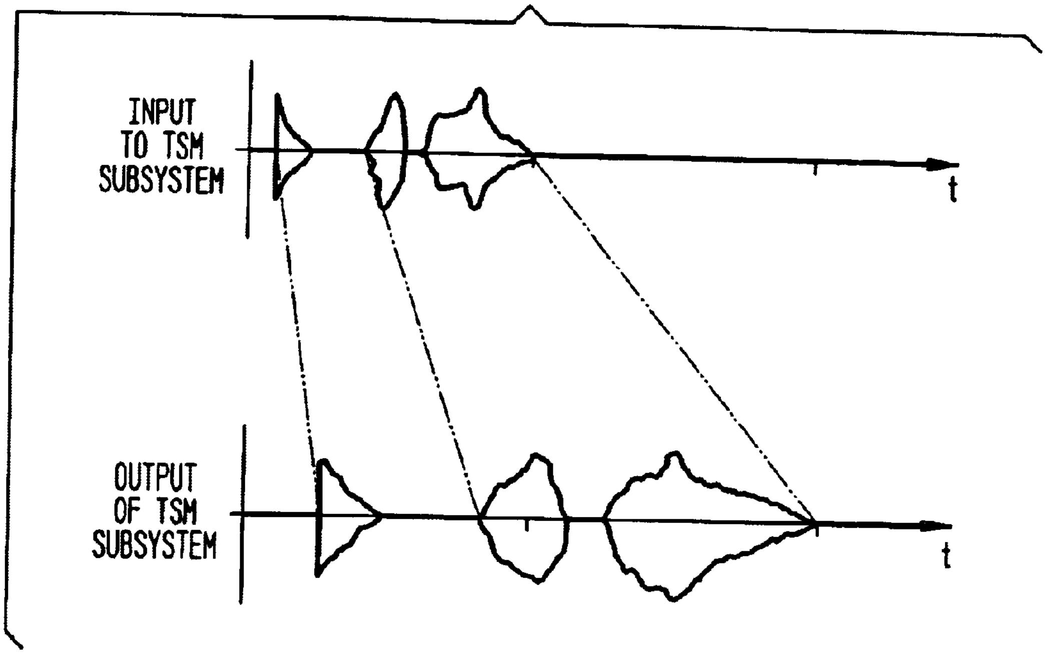
FIG. 5 shows, in graphical form, relative amounts of data at an input and an output of TSM Subsystem 800 in the embodiment of the present invention shown in FIG. 2 during time-scale compression, i.e., speed up of the playback rate of the streaming media.
Figure 6:
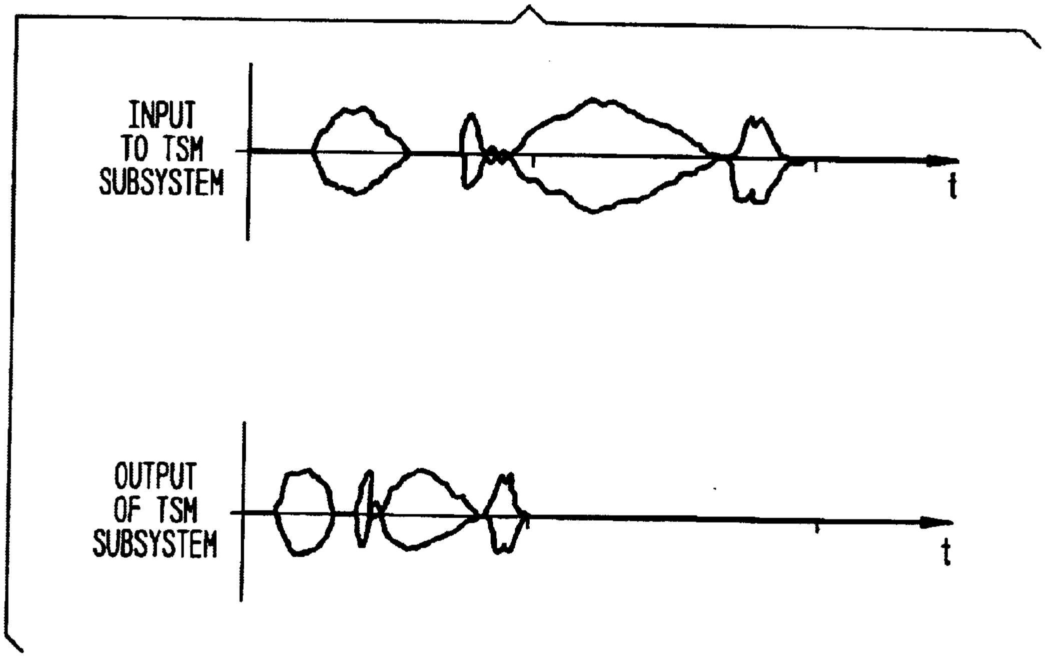
FIG. 6 shows, in graphical form, relative amounts of data at an input and an output of TSM Subsystem 800 in the embodiment of the present invention shown in FIG. 2 during time-scale expansion, i.e., slow down of the playback-rate of the streaming media.

In accordance with the present invention, TSM Subsystem 800 modifies the input stream of data in accordance with well known TSM methods to produce, as output, a stream of samples that represents a Time-Scale Modified signal. The Time-Scale modified output signal contains less samples per block of input data if Time-Scale Compression is applied, as shown in FIG. 6. Similarly, if Time-Scale Expansion is applied, the output from TSM Subsystem 800 contains more samples per block of input data, as shown in FIG. 5. Thus, TSM Subsystem 800 can create more samples than it is given by creating an output stream with a slower playback rate (Time-Scale Expanded). Similarly, TSM Subsystem 800 can create fewer samples than it is given by creating an output stream with a faster playback rate (Time-Scale Compressed). In a preferred embodiment of the present invention, the TSM method used is a method disclosed in U.S. Pat. No. 5,175,769 (the '769 patent), which '769 patent is incorporated by reference herein, one of the inventors of the present invention also being a joint inventor of the '769 patent. Thus, the output from TSM Subsystem 800 is a stream of samples representing portions of the audio or audio-visual work, which output is applied as input to Playback System 500. Playback System 500 plays back the data output from TSM Subsystem 800. There are many well known methods of implementing Playback System 500 that are well known to those of ordinary skill in the art. For example, many methods are known to those of ordinary skill in the art for implementing Playback system 500, for example, as a playback engine.

In accordance with the present invention, the stream of digital samples output from TSM Subsystem 800 has a playback rate, supplied from TSM Rate Determiner 700, that provides a balance of the data consumption rate of TSM Subsystem 800 with the arrival rate of data input to US 300. Note that, in accordance with this embodiment of the present invention, the data consumption rate of Playback System 500 is fixed to be identical to the data output rate of TSM Subsystem 800. Thus, when a playback rate representing Time-Scale Expansion is output from TSM Rate Determiner 700 and applied as input to TSM Subsystem 800, the number of data samples required per unit time by TSM Subsystem 800 is reduced in proportion to the amount of Time-Scale Expansion. A reduction in the number of data signals sent to TSM Subsystem 800 slows the data drain-rate from Capture Buffer 400 and, as a result, less data from Capture Buffer 400 is consumed per unit time. This, in turn, increases the amount of playback time before a pause is required due to emptying of Capture Buffer 400.

As one of ordinary skill in the art should readily appreciate, although the present invention has been described in terms of slowing down playback, the present invention is not thusly limited and includes embodiments where the playback rate is increased in situations where data arrives in Capture Buffer 400 at a rate which is faster than the rate at which it would be consumed during playback at a normal rate. In this situation the playback rate is increased and the data is consumed by TSM Subsystem 800 at a faster rate to avoid having Capture Buffer 400 overflow.

As one of ordinary skill in the art can readily appreciate, whenever embodiment 1000 provides playback rate adjustments for an audio-visual work, TSM Subsystem 800 speeds up or slows down visual information to match the audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped.

Although FIG. 2 shows embodiment 1000 to be comprised of separate modules, in a preferred embodiment, Playback System 500, Capture Buffer Monitor 600, TSM Rate Determiner 700, and TSM Subsystem 800 are embodied as software programs or modules which run on a general purpose computer such as, for example, a personal computer. It should be well known to one of ordinary skill in the art, in light of the detailed description above, how to implement these programs or modules in software.

As should be clear to those of ordinary skill in the art, embodiments of the present invention include the use of any one of a number of algorithms for determining the playback rate to help balance the rate of data consumption for playing back the audio or audio-visual works with the rate of data input from network 200 having non-deterministic delays. In one embodiment of the present invention, the playback rate is determined to vary with the fraction of Capture Buffer 400 that is filled with data. For example, for each 10% decrement of data depletion, the playback rate is reduced by 10% except when the input data contains an "end" signal. It should be clear to those of ordinary skill in the art how to modify this algorithm to achieve any of a number of desired balance conditions. For example, in situations where a delay duration can vary drastically, a non-linear relationship may be used to determine the playback rate. One non-linear function that may be used is the inverse tangent function. In this case, $$\text{Playback Rate}=\tan h^{-1}((2*\#\text{samples\_in\_buffer}/\text{elements\_in\_buffer}))-1 \quad (1)$$

where #samples_in_buffer is the number of samples of data in Capture Buffer 400 and elements_in_buffer is the total number of samples of data that can be stored in Capture Buffer 400.

Figure 3:
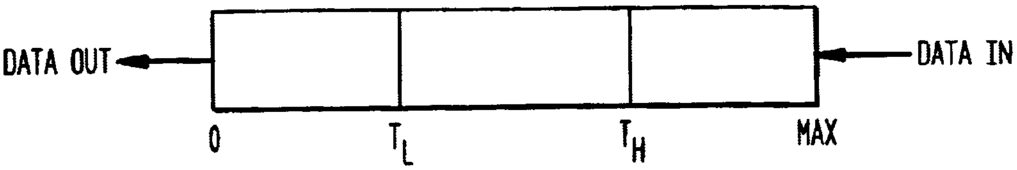
FIG. 3 shows, in pictorial form, low and high thresholds used in one embodiment of Capture Buffer 400 in the embodiment of the present invention shown in FIG. 2.

In a preferred embodiment of the present invention, a low threshold ($T_L$) value and a high threshold ($T_H$) value are be used to construct a piece-wise graph of playback rate versus amount of data in Capture Buffer 400. FIG. 3 shows, in pictorial form, how $T_L$ and $T_H$ relate to the amount of data in Capture Buffer 400. These thresholds are used in accordance with to the following set of equations:

$$\text{For } 0<=X<=T_L \text{ Playback Rate}=\text{Scale} \tan h^{-1}((X-T_L)/T_L) \quad (2)$$

$$\text{For } T_L<X<T_H \text{ Playback Rate}=1.0(\text{the default playback rate}) \quad (3)$$

$$\text{For } T_H<=X<=\text{Max Playback Rate}=\text{Scale} \tan h^{-1}((X-T_H)/(\text{Max}-T_H)) \quad (4)$$

where Scale is arbitrary scale factor.

Figure 4:
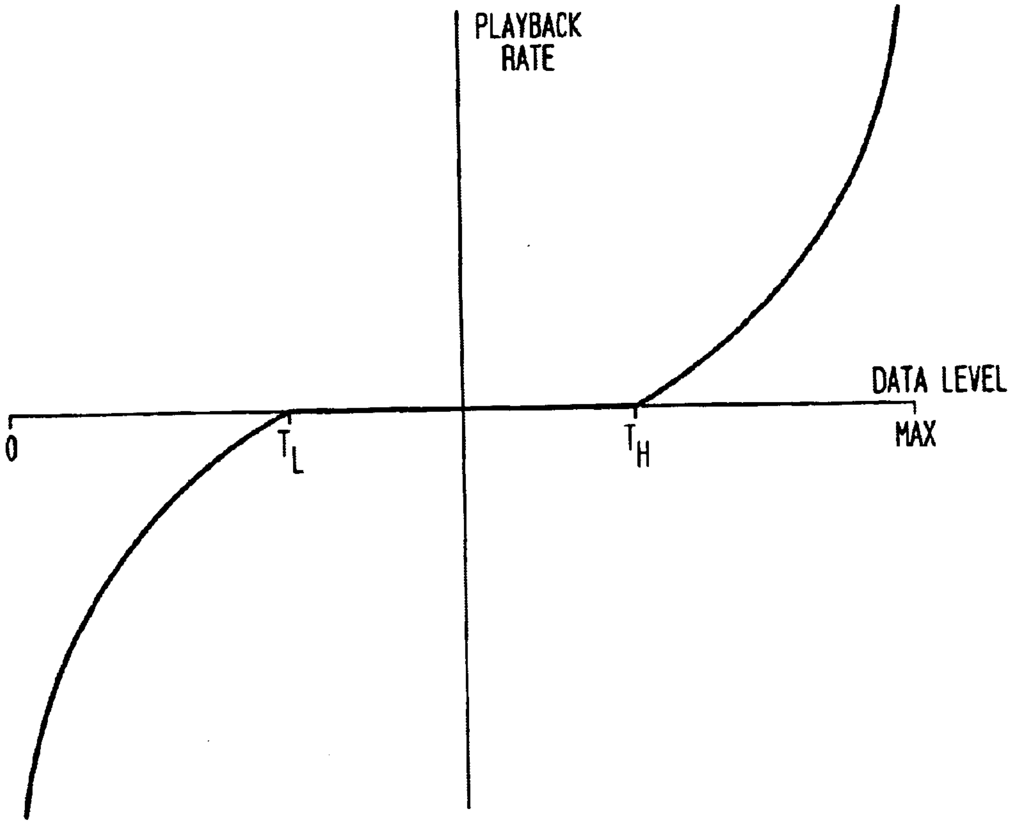
FIG. 4 shows a graph of playback rate versus the amount of data in Capture Buffer 400 in the embodiment of the present invention shown in FIG. 2.

FIG. 4 shows a graph of playback rate versus amount of data in Capture Buffer 400 using eqns. (2)–(4). From FIG. 4, one can readily appreciate that for small deviations from an ideal amount of data in Capture Buffer 400 (origin 0 in FIG. 4), changes in the playback rate are linear; however, larger deviations generate a more pronounced non-linear response. Further, changes in the amount of data in Capture Buffer 400 which remain between low threshold level $T_L$ and high threshold level $T_H$ do not cause any change in playback rate. The parameters $T_L$ and $T_H$ can be set as predetermined parameters for embodiment 1000 in accordance with methods which are well known to those of ordinary skill in the art or they can be entered and/or varied by receiving user input through a user interface in accordance with methods which are well known to those of ordinary skill in the art. However, the manner in which these parameters are set and/or varied are not shown for ease of understanding the present invention.

As should be clear to those of ordinary skill in the art, the inventive technique for providing substantially continuous playback may be combined with any number of apparatus which provide time-scale modification and may be combined with or share components with such systems.

Embodiments of the present invention are advantageous in enabling a single-broadcast system utilizing a broadcast server to provide a single broadcast across one or more non-deterministic delay networks to multiple recipients, for example across the Internet and/or other networks such as Local Area Networks (LANs) and Wide Area Networks (WANs). In such a single-broadcast system, the path to each recipient varies. In fact, the path to each recipient may dynamically change based on loading, congestion and other factors. Therefore, the amount of delay associated with the transmission of each data packet that has been sent by the broadcast server varies. In prior art client-server schemes, each recipient has to notify the broadcast server of its readiness to receive more data, thereby forcing the broadcast server to serve multiple requests to provide a steady stream of data at the recipients' data ports. Advantageously, embodiments of the present invention enable the broadcast server to send out a steady stream of information, and the recipients of the intermittently arriving data to adjust the playback rate of the data to accommodate the non-uniform arrival rates. In addition, in accordance with the present invention, each of the recipients can accommodate the arrival rates independently.

Those skilled in the art will recognize that the foregoing description has been presented for the sake of illustration and description only. As such, it is not intended to be exhaustive or to limit the invention to the precise form disclosed.

For example, those of ordinary skill in the art should readily understand that whenever the term "Internet" is used, the present invention also includes use with any non-deterministic delay network. As such, embodiments of the present invention include and relate to the world wide web, the Internet, intranets, local area networks ("LANs"), wide area networks ("WANs"), combinations of these transmission media, equivalents of these transmission media, and so forth.

In addition, it should be clear that embodiments of the present invention may be included as parts of search engines used to access streaming media such as, for example, audio or audio-visual works over the Internet.

In further addition, it should be understood that although embodiments of the present invention were described where the audio or audio-visual works were applied as input to playback systems, the present invention is not limited to the use of a playback system. It is within the spirit of the present invention that embodiments of the present invention include embodiments where the playback system is replaced by a distribution system, which distribution system is any device that can receive digital audio or audio-visual works and re-distribute them to one or more other systems that replay or re-distribute audio or audio-visual works. In such embodiments, the playback system is replaced by any one of a number of distribution applications and systems which are well known to those of ordinary skill in the art that further distribute the audio or audio-visual work. It should be understood that the devices that ultimately receive the re-distributed data can be "dumb" devices that lack the ability to perform Time-Scale modification or "smart" devices that can perform Time-Scale modification.

It should be clear to those of ordinary skill in the art, in light of the detailed description set forth above, that in essence, embodiments of the present invention (a) determine a measure of a mismatch between a data arrival rate and a data consumption rate and (b) utilize time-scale modification to adjust these rates. Various embodiments of the invention utilize various methods (a) for determining information which indicates the measure of the mismatch and (b) for determining a playback rate which enables time-scale modification to adjust for the mismatch in a predetermined amount.

In light of this, in another embodiment of the present invention, the playback system determines that there is a data mismatch because it determines a diminution in the arrival of data for playback or subsequent distribution. In response, the playback system sends this information to the TSM Rate Determiner to develop an acceptable playback rate. For example, the playback rate may be reduced by a predetermined amount based on an input parameter or in accordance with any one of a number of algorithms that may be developed by those of ordinary skill in the art.

What is claimed is:

1. A client apparatus for preparing streaming media received over a non-deterministic delay network for playback or distribution which comprises:

a buffer which stores data corresponding to the streaming media;

a buffer monitor which determines an amount of data stored in the buffer;

a rate determiner, in response to output from the buffer monitor, that determines a time-scale modification playback rate; and a time-scale modification system, responsive to the time-scale modification playback rate, that time-scale modifies at least a portion of the data in the buffer;

wherein the rate determiner determines the time-scale modification playback rate as a non-linear function of the amount of data;

wherein $T_L$ is a low threshold value and $T_H$ is a high threshold value of data in the buffer; and For $0 <= X <= T_L$; time-scale modification playback rate= $Scale*\tan h^{-1}((X-T_L)/T_L)$ For $T_L < X < T_H$; time-scale modification playback rate=a predetermined time-scale modification playback rate For $T_H <= X <= Max$; time-scale modification playback rate= $Scale*\tan h^{-1}((X-T_H)/(Max-T_H))$;

where X is the amount of data in the buffer, Max is the maximum amount of data that can be stored in the buffer, and Scale is arbitrary scale factor.

2. The client apparatus of claim 1 wherein the non-linear function depends on predetermined threshold parameters.

* * * * *